(12) United States Patent
Liu

(10) Patent No.: US 12,734,941 B2
(45) Date of Patent: Sep. 15, 2026

(54) MULTIFUNCTIONAL BABY CARRIER

(71) Applicant: SUNNYLOVE BABY PRODUCTS ZHUHAI CO., LTD, Zhuhai City (CN)

(72) Inventor: Xiu Ping Liu, Zhuhai City (CN)

(73) Assignee: SUNNYLOVE BABY PRODUCTS ZHUHAI CO., LTD, Zhuhai City (CN)

( * ) Notice: Subject to any disclaimer, the term of this patent is extended or adjusted under 35 U.S.C. 154(b) by 160 days.

(21) Appl. No.: 18/928,150

(22) Filed: Oct. 27, 2024

(65) Prior Publication Data

US 2025/0135969 A1 May 1, 2025

(30) Foreign Application Priority Data

Nov. 1, 2023 (CN) ......................... 202322957122.7

(51) Int. Cl.
*B60N 2/28* (2006.01)

(52) U.S. Cl.
CPC ......... *B60N 2/2845* (2013.01); *B60N 2/2878* (2013.01); *B60N 2/2884* (2013.01)

(58) Field of Classification Search
CPC .......... B60N 2/28–2884; B60N 2/3011; B60N 2/00–995; B60N 3/00–18; A47C 1/0342; A47C 1/0347
USPC ............................................ 297/256, 256.13
See application file for complete search history.

(56) References Cited

U.S. PATENT DOCUMENTS

| | | | | |
|---|---|---|---|---|
| 12,643,438 B2 * | 6/2026 | Mchugh | B60N 2/2821 |
| 2019/0176662 A1 * | 6/2019 | Pleiman | B60N 2/2851 |
| 2023/0271534 A1 * | 8/2023 | Lawrence | B60N 2/002 297/183.2 |
| 2025/0187504 A1 * | 6/2025 | Liu | B60N 2/2812 |

FOREIGN PATENT DOCUMENTS

| | | | |
|---|---|---|---|
| EP | 1084900 A2 * | 3/2001 | B60N 2/2806 |

* cited by examiner

*Primary Examiner* — Terrell L Mckinnon
*Assistant Examiner* — Gelila Kebede
(74) *Attorney, Agent, or Firm* — Che-Yang Chen

(57) ABSTRACT

A multifunctional baby carrier includes a carrier body having a backrest portion and a seat portion, wherein a back support panel is provided at an inner side of the backrest portion, an adjustment mechanism is provided between the back support panel and the backrest portion for adjusting a highest angle position and a lowest angle position therebetween, wherein the adjustment mechanism is configured in a manner that when the baby carrier is connected to a car seat or an independent base for use, the back support panel is rotated with respect to the backrest portion and locked at the highest angle position.

11 Claims, 8 Drawing Sheets

MULTIFUNCTIONAL BABY CARRIER

CROSS REFERENCE OF RELATED APPLICATION

This application is a non-provisional application that claims priority under 35 U.S.C. § 119 to China application number CN202322957122.7, filing date Nov. 1, 2023, wherein the entire content of which is expressly incorporated herein by reference.

BACKGROUND OF THE PRESENT INVENTION

Field of Invention

The present invention relates to safety travel product for baby, and more particular to a multifunctional baby carrier.

Description of Related Arts

A baby carrier such as a baby safety seat or carrier can effectively protect the safety of baby while driving, and thus is a necessary device when traveling with a baby.

A conventional baby carrier generally includes a seat portion, a backrest portion and a headrest on the backrest portion for supporting the baby's head. However, in the prior art, the headrest and the backrest portion are usually fixedly with each other and cannot be adjusted with respect to each other. This results in that when the baby carrier is connected to a stroller frame or a car seat, the headrest cannot be adjusted with respect to the backrest portion to switch to the required use state according to the use requirements and use scenarios, resulting in inconvenience in use and limited function.

Therefore, the present invention is studied and proposed in view of the above problems.

SUMMARY OF THE PRESENT INVENTION

The purpose of the present invention is to overcome the shortcomings of the prior art and provide a multifunctional baby carrier which features an adjustment mechanism which allows a back support panel to have the function of switching between a highest angle position and a lowest angle position, so that the baby carrier can be adjusted to the required usage state according to usage requirements or usage scenarios, and has the characteristics of easy use and multifunctional use.

The present invention discloses a multifunctional baby carrier, which has a first usage state and a second usage state, and comprises a carrier body comprising a backrest portion and a seat portion, wherein a back support panel is provided at an inner side of the backrest portion, an adjustment mechanism is provided between the back support panel and the backrest portion for adjusting a highest angle position and a lowest angle position therebetween, wherein the adjustment mechanism is configured in a manner that when the baby carrier is in the first usage state and is connected to a car seat or an independent base for use, the back support panel is rotated with respect to the backrest portion and locked at the highest angle position.

In the multifunctional baby carrier as described above, the adjustment mechanism is further configured in a manner that in the second usage state, the back support panel can be switched and adjusted between the highest angle position and the lowest angle position.

In the multifunctional baby carrier as described above, a lower side of the back support panel is rotatably connected to the backrest portion, the adjustment mechanism has at least one driving sliding slot provided at the back support panel and at least one push rod movably provided at a bottom of the carrier body, an upper end of the push rod is slidably engaged with the driving slide groove, a lower end of the push rod is extended out of the bottom of the carrier body in the second usage state, and the lower end of the push rod is pushed by an upper surface of the car seat or the independent base in the first usage state and retracted into the bottom of the carrier body.

In the multifunctional baby carrier as described above, a push rod sliding channel is provided at the bottom of the carrier body for allowing the push rod to slide therein.

In the multifunctional baby carrier as described above, when the baby carrier is connected to the car seat or the independent base for use, the upper end of the push rod is in the first usage state to abut against an upper end wall of the driving sliding slot to lock the back support panel with respect to the backrest portion at the highest angle position.

In the multifunctional baby carrier as described above, two driving slide grooves are respectively provided at two sides of the back support panel, and each of the driving slide grooves is slidably coupled with the upper end of the corresponding push rod.

In the multifunctional baby carrier as described above, the adjustment mechanism further has a movable slot provided at the back support panel and a fixed slot provided at the backrest portion, the movable slot and the fixed slot are cross-arranged, and the adjustment mechanism further comprises an adjustment sliding rod slidably engaged with both of the movable slot and the fixed slot.

In the multifunctional baby carrier as described above, the back support panel is provided with a sliding rod locking mechanism for locking the adjustment sliding rod with respect to the back support panel when the back support panel is at the highest angle position.

As described above, in a multifunctional baby carrier, the sliding rod locking mechanism comprises a locking block movably arranged on an upper part of the movable slot and used to lock the adjustment sliding rod with respect to the back support panel when the back support panel is at the highest angle position, a locking elastic member is provided between the locking block and the back support panel, and an unlocking linkage button for linking the locking block to unlock the action is provided on the back support panel.

In the multifunctional baby carrier as described above, a color display block is provided on the adjustment sliding rod, and a display window for displaying and identifying the color display block when the back support panel is at the highest angle position is provided at the backrest portion.

Compared with the prior art, the present invention has the following advantages.

1. The present invention enables the back support panel to switch between the highest angle position and the lowest angle position through the adjustment mechanism, so that the baby carrier can be adjusted to the required use state according to the use requirements or use scenarios, and has the characteristics of convenient use and multi-functional use; and when the baby carrier is connected to the car seat or the independent base in the first usage state, the back support panel can only use the highest angle position. This design effectively prevents the issue of forgetting to adjust the back support panel and protects the baby's cervical vertebrae from damage caused by impact during vehicle movement.

2. In the second usage state of the present invention, the back support panel can be switched and adjusted between the highest angle position and the lowest angle position, so as to offer personalized adjustments to optimize the backrest angle and ensure a comfortable seating experience.
3. The present invention can limit and guide the push rod through the push rod sliding channel, ensuring that the push rod can only slide along the set direction, so that the push rod and the driving slide slot can be used reliably.
4. When the present invention is in the first usage state, the upper end of the push rod abuts against the upper end wall of the driving sliding slot to achieve a single locking function of the back support panel; in addition, the sliding rod locking mechanism is used to achieve a double locking function of the back support panel, so it has the characteristics of safe and reliable locking.

BRIEF DESCRIPTION OF THE DRAWINGS

The specific embodiments of the present invention are further described in detail below with reference to the accompanying drawings.

DETAILED DESCRIPTION OF THE PREFERRED EMBODIMENT

Figure 1:
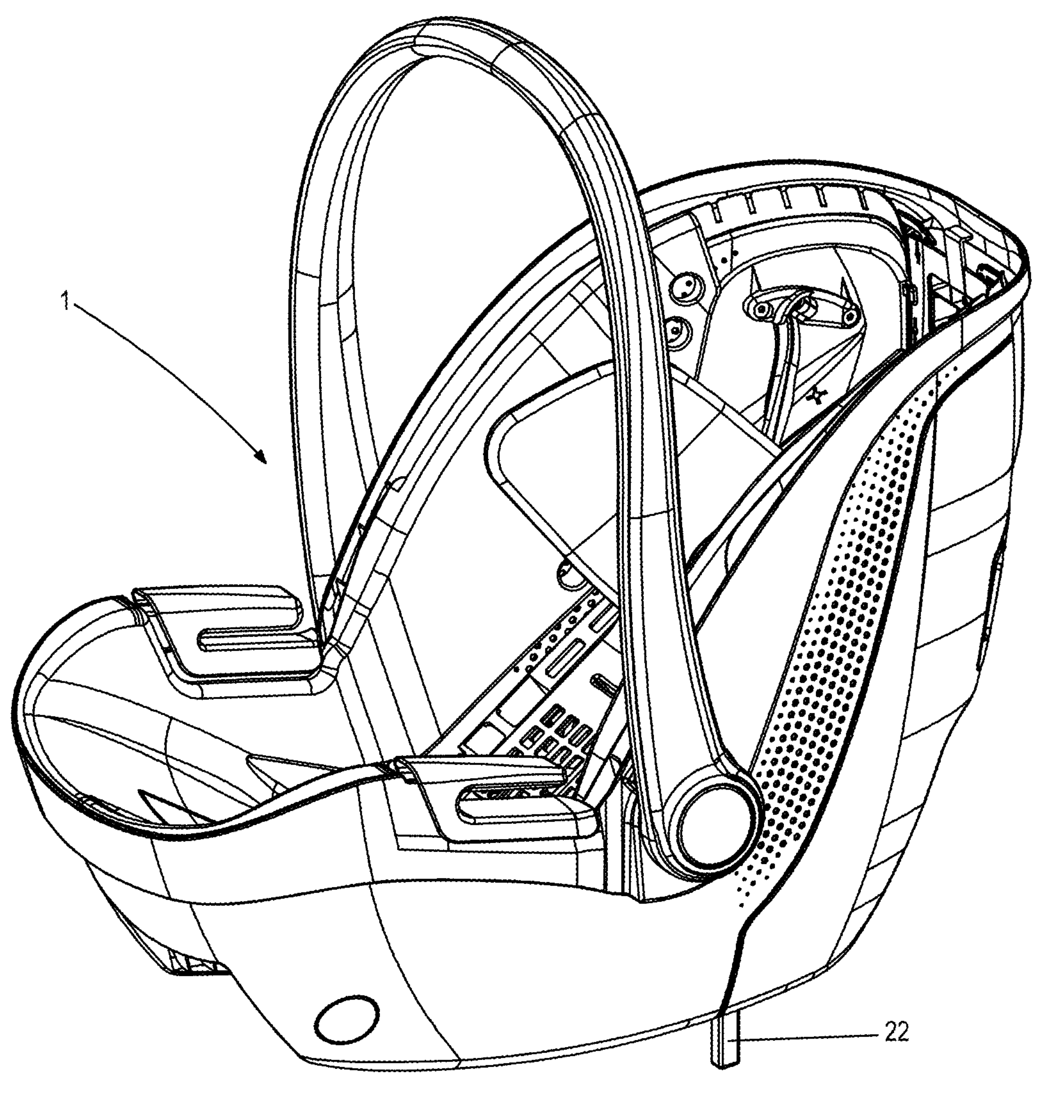
FIG. 1 is a perspective view of the present invention.
Figure 2:
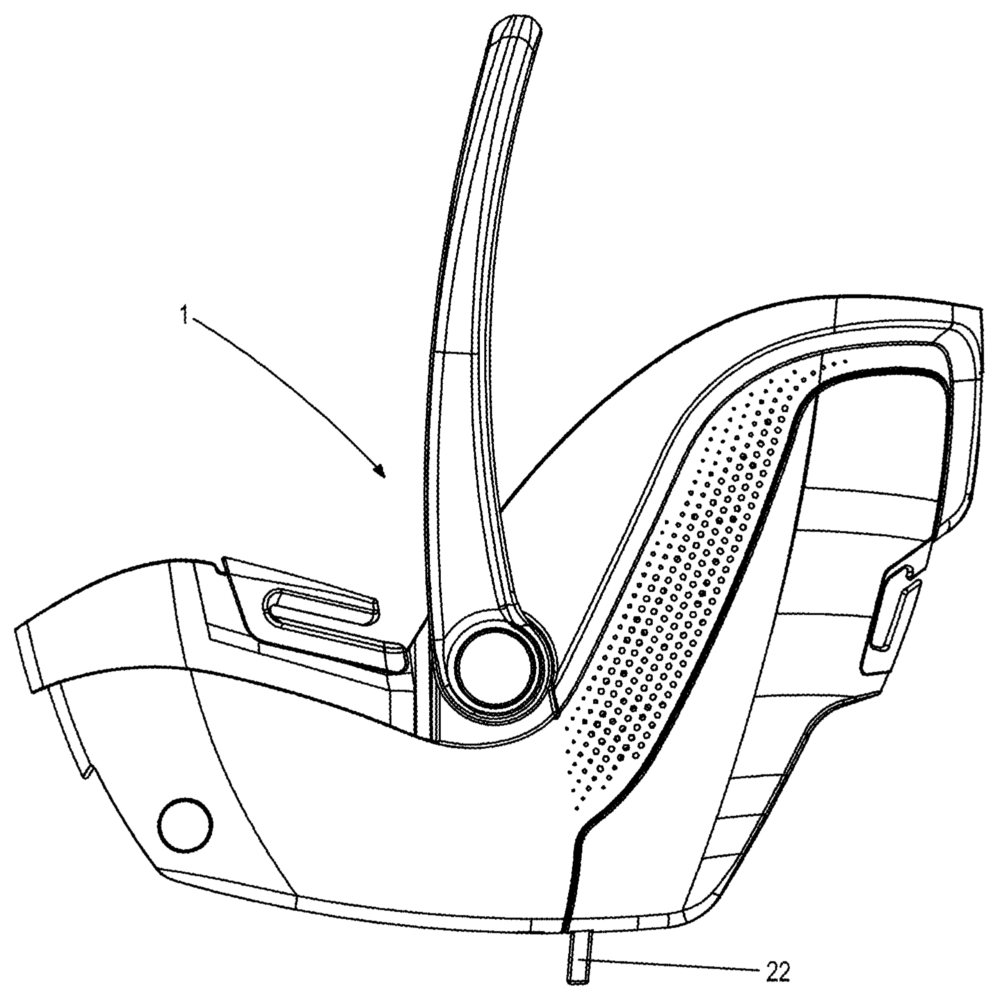
FIG. 2 is a side view of the present invention.

The embodiments of the present invention are described in detail below with reference to the accompanying drawings.

As shown in FIGS. 1-8, the present invention discloses a multifunctional baby carrier which has a first usage state and a second usage state, the multifunctional baby carrier comprises a carrier body 1 comprising a backrest portion 11 and a seat portion 10, wherein a back support panel 12 is provided at an inner side of the backrest portion 11, the back support panel 12 is provided with a headrest portion 121, and an adjustment mechanism 2 is provided between the back support panel 12 and the backrest portion 11 for adjusting a highest angle position and a lowest angle position between the back support panel 12 and the backrest portion 11, wherein the adjustment mechanism 2 is configured in a manner that when the baby carrier is in the first usage state and the baby carrier is connected to a car seat or an independent base for use, the back support panel 12 is rotated with respect to the backrest portion 11 and locked at the highest angle position; and the adjustment mechanism 2 is further configured in a manner that when the baby carrier is in the second usage state, the back support panel 12 can be switched and adjusted between the highest angle position and the lowest angle position. The present invention adopts the adjustment mechanism 2 to enable the back support panel 12 to switch between the highest angle position and the lowest angle position, so that the baby carrier can be adjusted to the desired use state according to the use requirements or use scenarios, and has the characteristics of convenient use and multifunctional use. When the baby carrier is connected to the car seat or an independent base in the first usage state, the back support panel 12 can only be used at the highest angle position, this design effectively prevents the issue of forgetting to adjust the back support panel 12 and protects the baby's cervical vertebrae from damage caused by impact during vehicle movement, thus enhancing safety. In addition, in the second usage state of the present invention, the back support panel 12 can be switched between the highest angle position and the lowest angle position, so as to offer personalized adjustments to optimize the backrest angle and ensure a comfortable seating experience.

Referring to FIGS. 1-8, to better facilitate the rotation and adjustment of the back support panel 12, a lower side of the back support panel 12 is rotatably connected to the backrest portion 11. The adjustment mechanism 2 has at least one driving sliding slot 21 formed in the back support panel 12 and comprises at least one push rod 22 that is movably located at a bottom of the carrier body 1. An upper end of each push rod 22 is slidably coupled to the driving sliding slot 21, and a lower end of each push rod 22 is extended out of the bottom of the carrier body 1 in the second usage state. In the first usage state, the lower end of each push rod 22 is pushed back into the bottom of the carrier body 1 by a surface of the car seat or the independent base.

Figure 3:
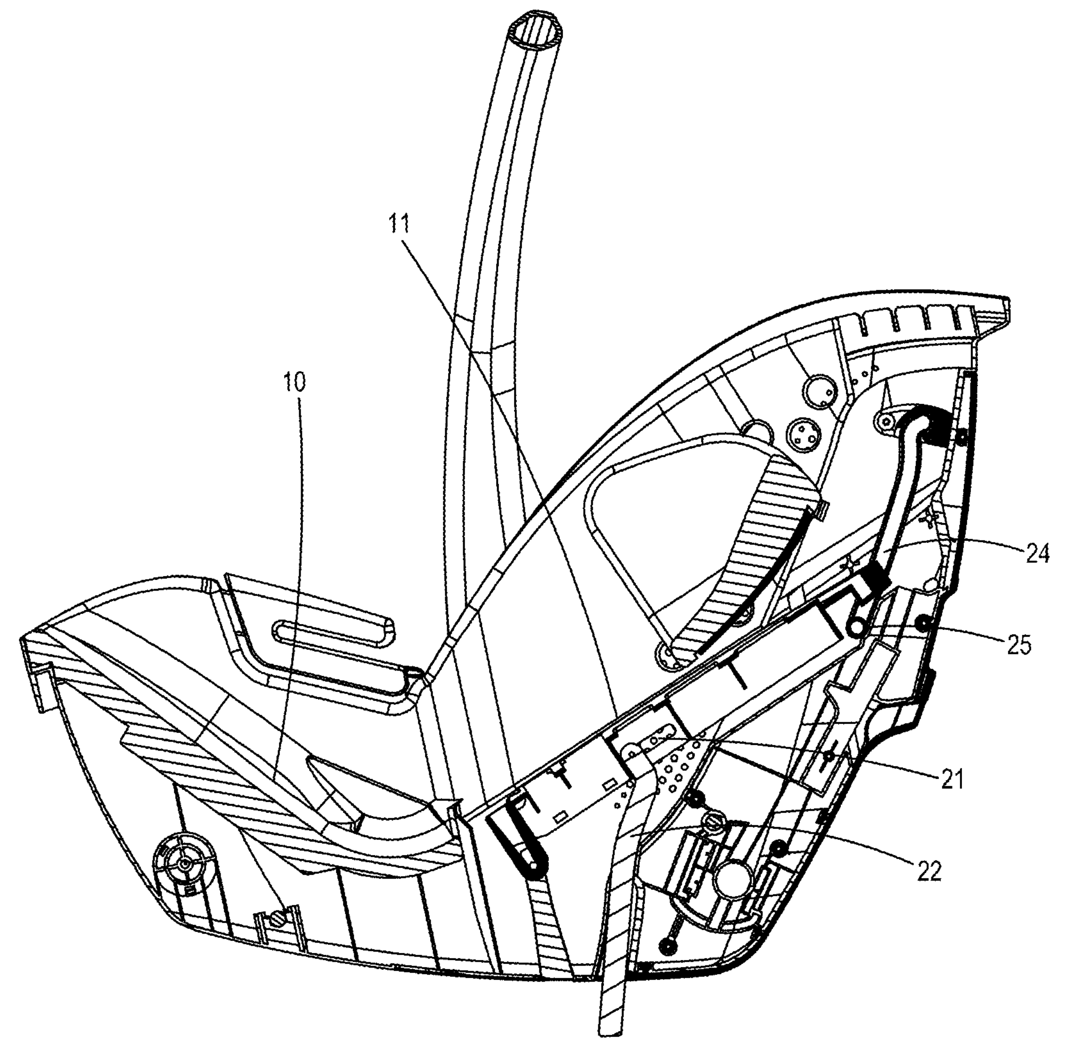
FIG. 3 is a first cross-sectional view of the back support panel of the present invention when the back support panel is in a second usage state.
Figure 4:
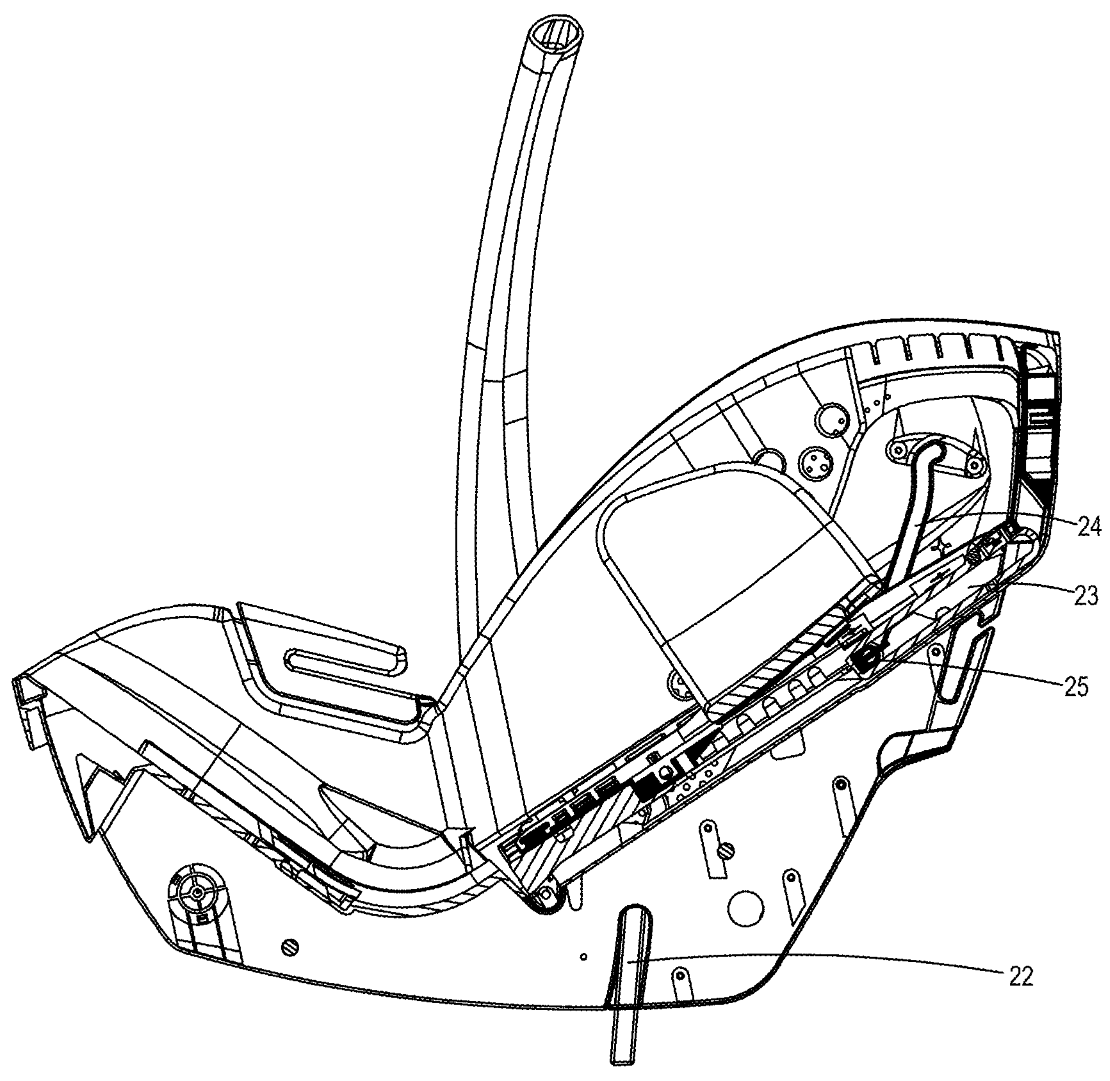
FIG. 4 is a second cross-sectional view of the back support panel of the present invention when the back support panel is in the second usage state.
Figure 5:
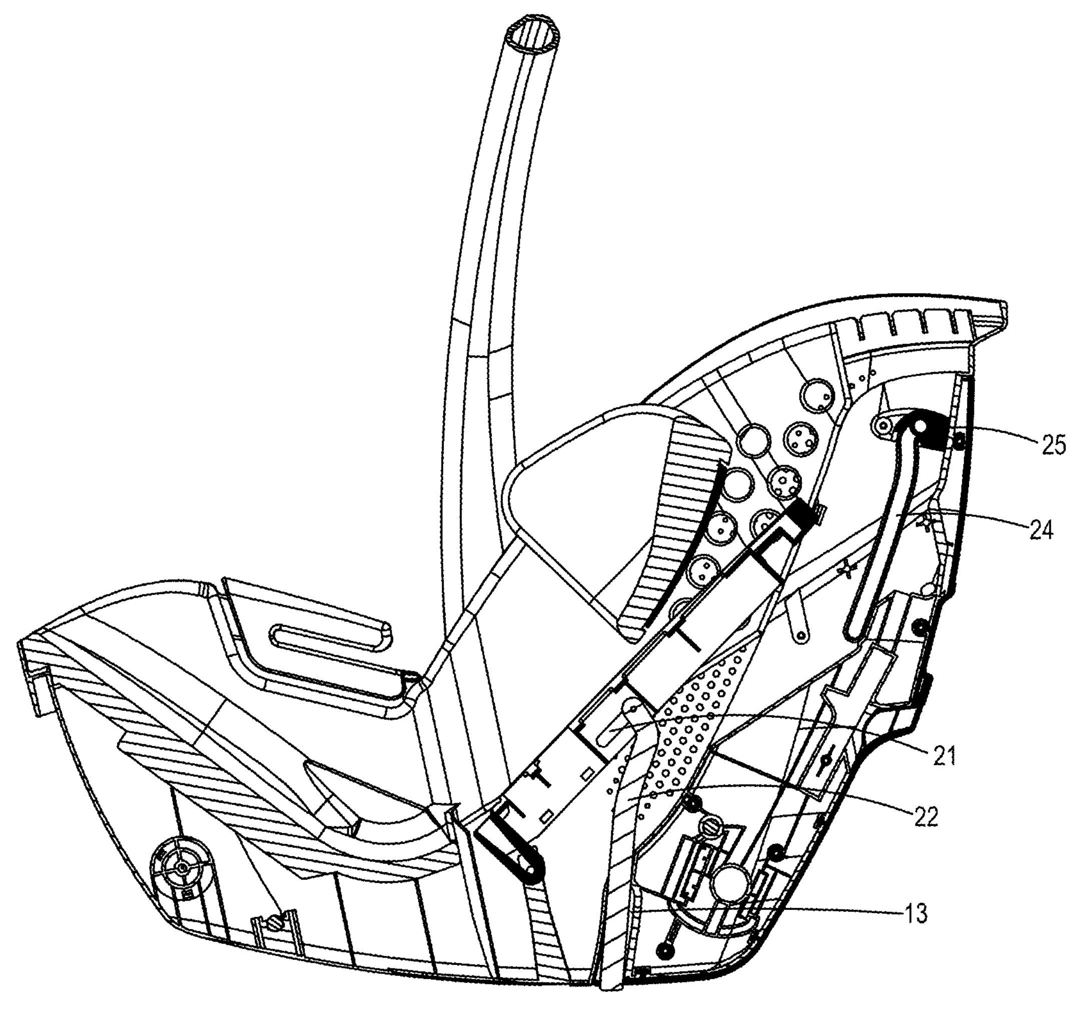
FIG. 5 is a first cross-sectional view of the back support panel of the present invention when the back support panel is in a first usage state.

As shown in FIGS. 3 and 5, the bottom of the carrier body 1 is provided with at lease one push rod sliding channel 13, which allows the push rod 22 to slide at an inner side of it. This design provides both positioning and guiding functions for the corresponding push rod 22, ensuring that the push rod 22 can only slide in a predetermined direction, thereby facilitating the reliable cooperation between the push rod 22 and the driving sliding slot 21.

As shown in FIG. 5, in the first usage state, when the baby carrier is connected to the car seat or an independent base, the upper end of the push rod 22 abuts an upper wall 211 of the corresponding driving sliding slot 21, so as to lock the back support panel 12 with respect to the backrest portion 11 at the highest angle position. This design allows the back support panel 12 to be locked without additional locking mechanism, making the upper end of the push rod 22 and the upper wall 211 of the driving sliding slot 21 serve multiple purposes, thus enhancing practicality.

Accordingly, in the first usage state when the baby carrier is connected to the car seat or the independent base, the back support panel 12 is pivotally rotated to be at the highest angle position to ensure that the head of the baby is supported in an substantial upright posture. This upright or vertical alignment of the headrest portion 121 is crucial for protecting the delicate cervical spine of the baby, especially during vehicle movements such as sudden stops or impacts.

The installation orientation of the baby carrier is not limited. In other words, the baby carrier can be installed on the car seat or the independent base to arrange the backrest portion 11 in front of the baby or behind the baby to allow the baby to face forward or backward in the car. If the baby is in a reclining position, his or her head may flop forward or backward upon sudden acceleration or deceleration of the car, straining the neck. By locking the headrest panel 12 in a substantially vertical position, the design prevents this forward head movement, minimizing the risk of airway obstruction and ensuring proper neck alignment. In other words, in the event of sudden acceleration or deceleration of the car, the head of the baby can be subjected to whiplash forces. In the present invention, by keeping the back support panel 12 at the highest angle position with the headrest portion 121 in a substantial vertical state, the design significantly reduces the range of motion for the head and neck of the baby. This rigidity helps prevent excessive flexing of the cervical spine and absorbs some of the forces that would otherwise be transmitted to the neck during vehicle movement.

When the upper end of the push rod 22 slides to a lower wall 212 of the driving sliding slot 21 and the back support panel 12 rotates to the lowest angle position, at this time, the headrest portion 121 is in an inclined state. Accordingly, when the baby carrier is in the second usage state, the inclined positioning of the back support panel 12 and the headrest portion 121 is ideal for other using occasions such as a stroller mode where the baby typically requires a more relaxed or reclining position. This versatility allows the baby carrier to adapt smoother transition between car seat mode and stroller mode.

Figure 7:
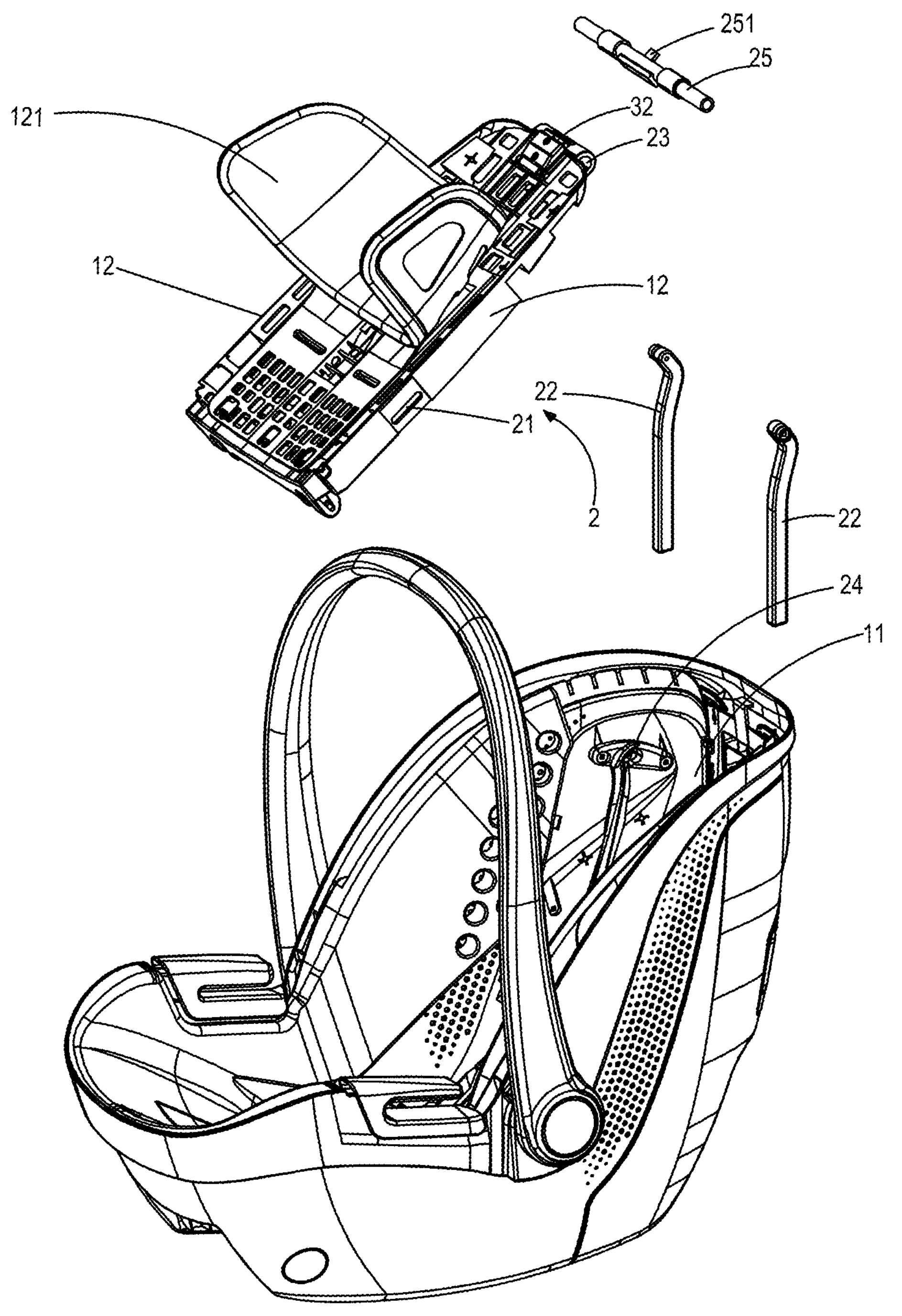
FIG. 7 is an exploded perspective view of the present invention.
Figure 8:
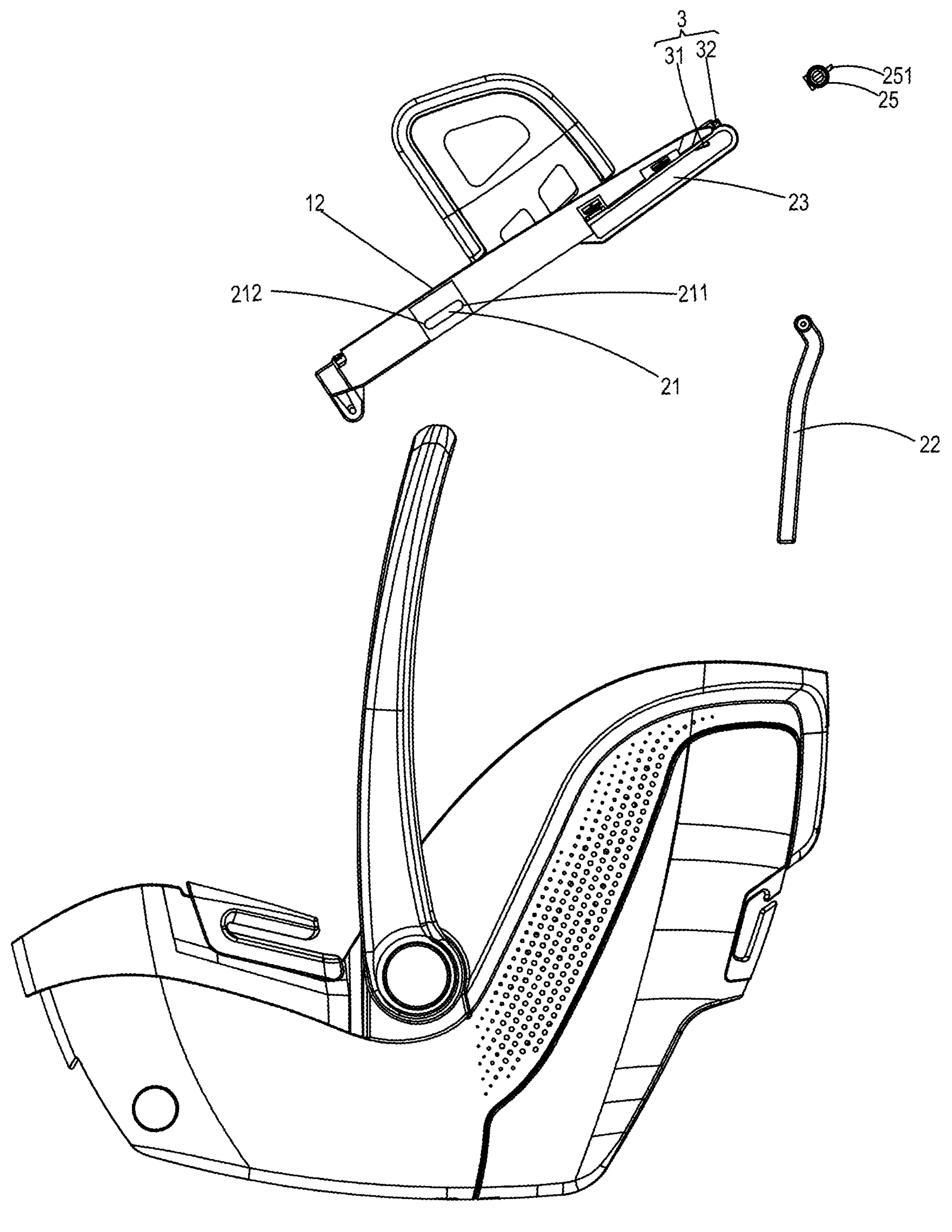
FIG. 8 is an exploded side view of the present invention.

As shown in FIGS. 7 and 8, two sides of the back support panel 12 are respectively provided with the driving sliding slots 21, two push rods 22 are respectively slidably coupled with the two driving sliding slots 21. In the first usage state, when the lower end of each push rod 22 is pushed by the surface of the car seat or independent base and retracted into the bottom of the carrier body 1, the push rods 22 on two sides support the back support panel 12, resulting in a more stable back support structure with higher structural strength. Moreover, regardless of whether the baby carrier is adjusted clockwise or counterclockwise, the car seat or independent base pushes the corresponding push rods 22, thus driving the rotation adjustment of the back support panel 12.

Referring to FIGS. 3-8, in order to ensure that the back support panel 12 and the backrest portion 11 are securely connected, the adjustment mechanism 2 further comprises a movable slot 23 at the back support panel 12 and a fixed slot 24 at the backrest portion 11, the movable slot 23 is movable along with the back support panel 12. These slots are arranged to cross each other. Additionally, the adjustment mechanism 2 comprises an adjustment sliding rod 25 that is slidably engaged with both the movable slot 23 and the fixed slot 24.

A plurality of locking grooves may be defined between adjacent protrusions at an inner side of one of the movable slot 23 and the fixed slot 24, so as to further offer precision control over the inclination angle of the back support panel 12. This allows for fine-tuned adjustment between the highest and lowest angle positions, providing a highly customizable seating position for the baby depending on their activity, whether they are awake, asleep, or resting.

As the adjustment sliding rod 25 moves at an inner side of the slots, it can be retained securely in one of the locking grooves when stopped, preventing unintentional movement. This ensures that once the back support panel 12 is adjusted to a desired angle, it remains fixed in that position, contributing to both the safety of the baby and the peace of mind of the caregiver.

Figure 6:
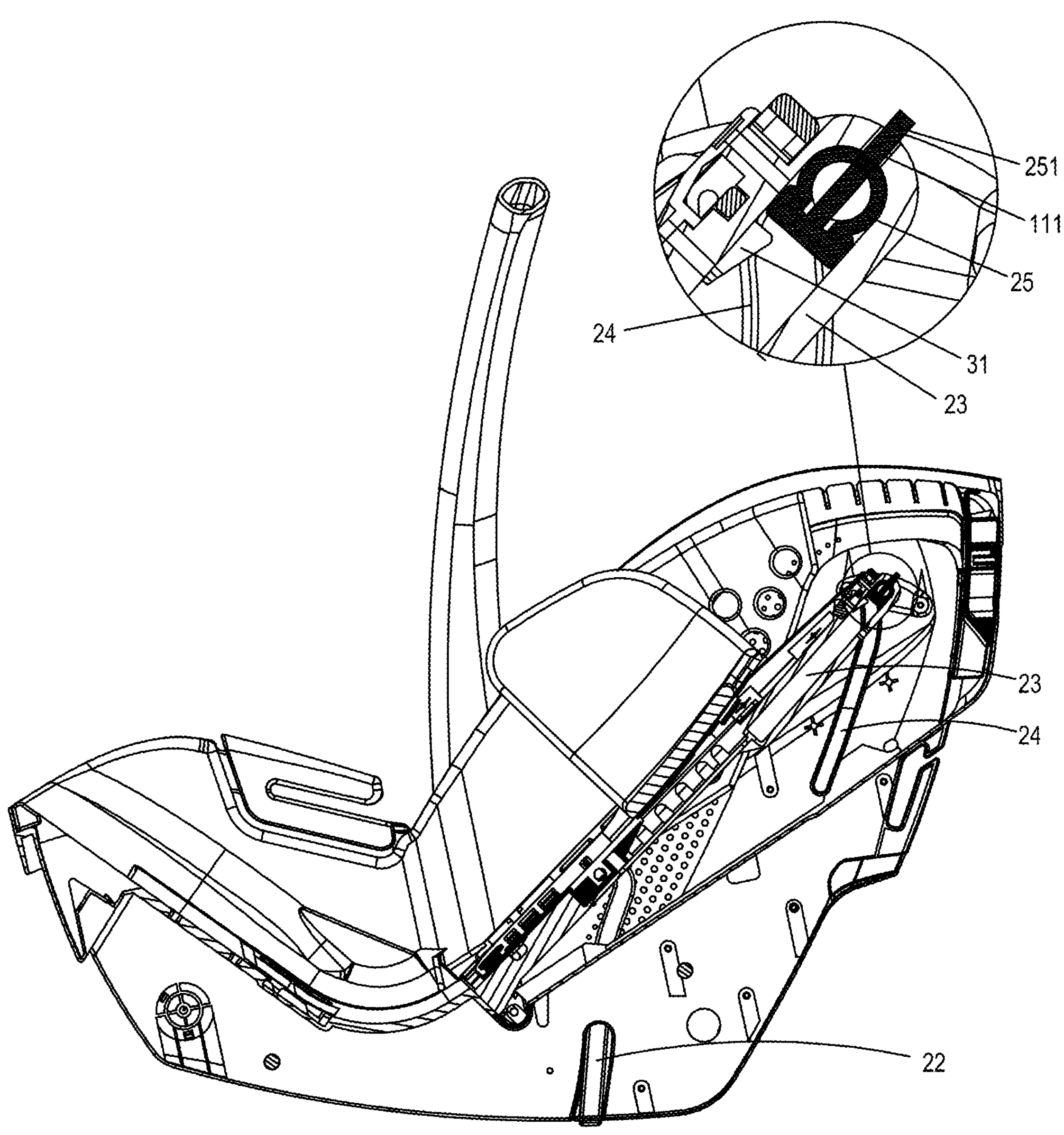
FIG. 6 is a second cross-sectional view of the back support panel of the present invention when the back support panel is in the first usage state.

As shown in FIGS. 6-8, to further lock the back support panel 12, the back support panel 12 is provided with a sliding rod locking mechanism 3 which is arranged to lock the adjustment sliding rod 25 with respect to the back support panel 12 when the back support panel 12 is at its highest angle position.

Preferably, the sliding rod locking mechanism 3 comprises a locking block 31 that is movably placed at an upper part of the movable slot 23. When the back support panel 12 is at the highest angle position, the locking block 31 locks the adjustment sliding rod 25 with respect to the back support panel 12. A locking elastic element is installed between the locking block 31 and the back support panel 12. Additionally, the back support panel 12 comprises an unlocking linkage button 32 to control the unlocking action of the locking block 31. The unlocking linkage button 32 and the locking block 31 feature complementary unlocking slopes. During unlocking, pressing the unlocking linkage button 32 causes the slope of the unlocking button to engage with the slope of the locking block 31, elastically retracting the locking block 31 and releasing the adjustment sliding rod 25. In other embodiments, the middle of the unlocking linkage button 32 is rotatably connected to the back support panel 12, and the unlocking end of the button 32 is rotatably connected to the locking block 31. Another locking elastic element can be also provided between the operating end of the unlocking linkage button 32 and the back support panel 12. Pressing the operating end of the unlocking linkage button 32 will rotate the unlocking end to retract the locking block 31 and release the adjustment sliding rod 25.

As shown in FIGS. 6-8, the adjustment sliding rod 25 comprises a color indicator block 251, and the backrest portion 11 has a display window 111 that reveals the color indicator block 251 when the back support panel 12 is at its highest angle position, providing a visual alert to ensure safety.

Working Principle: When the baby carrier is connected to a car seat or an independent base, the lower end of each push rod 22 is caused to contact the surface of the car seat or base, each push rod 22 will then move axially upward. The upper end of each push rod 22 slides in the corresponding driving sliding slot 21 and pushes the back support panel 12 to pivotally rotate with respect to the backrest portion 11. This rotation reduces the angle between the movable slot 23 and the fixed slot 24, pushing the adjustment sliding rod upward until each push rod 22 is fully retracted into the bottom of the carrier body 1, as shown in FIGS. 5 and 6. At this point, the locking block 31 locks the adjustment sliding rod 25, and the color indicator block 251 extends into the display window 111, allowing the user to confirm that the back support panel 12 is at its highest angle position.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed at an inner side of the spirit and scope of the following claims.

What is claimed is:

1. A multifunctional baby carrier having a first usage state and a second usage state, wherein the multifunctional baby carrier comprises a carrier body comprising:

a backrest portion;

a seat portion;

a back support panel provided at an inner side of said backrest portion, wherein said back support panel is provided with a headrest portion; and an adjustment mechanism provided between said back support panel and said backrest portion for adjusting a highest angle position and a lowest angle position therebetween, wherein said adjustment mechanism is configured in a manner that when the multifunctional baby carrier is in the first usage state and is connected to a car seat or an independent base for use, said back support panel is rotated with respect to said backrest portion and locked at the highest angle position, when the multifunctional baby carrier is in the second usage state, said back support panel is capable of being switched and adjusted between the highest angle position and the lowest angle position;

wherein a lower side of said back support panel is rotatably connected to said backrest portion, said adjustment mechanism has at least one driving sliding slot provided at said back support panel and at least one push rod movably provided at a bottom of said carrier body, an upper end of said push rod is slidably engaged with said driving sliding slot, a lower end of said push rod is extended out of the bottom of said carrier body in the second usage state, and said lower end of said push rod is pushed by an upper surface of the car seat or the independent base in the first usage state and retracted into the bottom of said carrier body.

2. The multifunctional baby carrier according to claim 1, wherein a push rod sliding channel is provided at the bottom of said carrier body for allowing said push rod to slide therein.

3. The multifunctional baby carrier according to claim 1, wherein when the multifunctional baby carrier is connected to the car seat or the independent base for use, said upper end of said push rod is in the first usage state to abut against an upper end wall of said driving sliding slot to lock said back support panel with respect to said backrest portion at the highest angle position.

4. The multifunctional baby carrier according to claim 1, wherein two said driving slide grooves are respectively provided at two sides of said back support panel, and each of said driving slide grooves is slidably coupled with said upper end of said corresponding push rod.

5. The multifunctional baby carrier according to claim 1, wherein said adjustment mechanism further has a movable slot provided at said back support panel and a fixed slot provided at said backrest portion, said movable slot and said fixed slot are cross-arranged, and said adjustment mechanism further comprises an adjustment sliding rod slidably engaged with both of said movable slot and said fixed slot.

6. The multifunctional baby carrier according to claim 2, wherein said adjustment mechanism further has a movable slot provided at said back support panel and a fixed slot provided at said backrest portion, said movable slot and said fixed slot are cross-arranged, and said adjustment mechanism further comprises an adjustment sliding rod slidably engaged with both of said movable slot and said fixed slot.

7. The multifunctional baby carrier according to claim 3, wherein said adjustment mechanism further has a movable slot provided at said back support panel and a fixed slot provided at said backrest portion, said movable slot and said fixed slot are cross-arranged, and said adjustment mechanism further comprises an adjustment sliding rod slidably engaged with both of said movable slot and said fixed slot.

8. The multifunctional baby carrier according to claim 4, wherein said adjustment mechanism further has a movable slot provided at said back support panel and a fixed slot provided at said backrest portion, said movable slot and said fixed slot are cross-arranged, and said adjustment mechanism further comprises an adjustment sliding rod slidably engaged with both of said movable slot and said fixed slot.

9. The multifunctional baby carrier according to claim 5, wherein said back support panel is provided with a sliding rod locking mechanism for locking said adjustment sliding rod with respect to said back support panel when said back support panel is at the highest angle position.

10. The multifunctional baby carrier according to claim 9, wherein said sliding rod locking mechanism comprises a locking block movably arranged on an upper part of said movable slot and used to lock said adjustment sliding rod with respect to said back support panel when said back support panel is at the highest angle position, wherein said locking block is resiliently coupled to said back support panel, wherein an unlocking linkage button is provided for unlocking said locking block.

11. The multifunctional baby carrier according to claim 9, wherein a color display block is provided on said adjustment sliding rod, and a display window for displaying and identifying said color display block when said back support panel is at the highest angle position is provided at said backrest portion.

* * * * *